(12) United States Patent
Kiyomura

(10) Patent No.: US 9,822,711 B2
(45) Date of Patent: Nov. 21, 2017

(54) CONTROL DEVICE FOR INTERNAL COMBUSTION ENGINE

(71) Applicant: HITACHI AUTOMOTIVE SYSTEMS, LTD., Hitachinaka-shi, Ibaraki (JP)

(72) Inventor: Akira Kiyomura, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 165 days.

(21) Appl. No.: 14/429,202

(22) PCT Filed: Sep. 18, 2013

(86) PCT No.: PCT/JP2013/075187
§ 371 (c)(1),
(2) Date: Mar. 18, 2015

(87) PCT Pub. No.: WO2014/046141
PCT Pub. Date: Mar. 27, 2014

(65) Prior Publication Data
US 2015/0267625 A1 Sep. 24, 2015

(30) Foreign Application Priority Data
Sep. 21, 2012 (JP) ................................. 2012-207923

(51) Int. Cl.
*G01M 15/00* (2006.01)
*F02D 15/02* (2006.01)
(Continued)

(52) U.S. Cl.
CPC ......... *F02D 15/02* (2013.01); *F02D 13/0226* (2013.01); *F02D 41/0002* (2013.01);
(Continued)

(58) Field of Classification Search
CPC .... F02D 15/02; F02D 13/0226; F02D 41/002; F02D 2250/18; F02D 2041/001;
(Continued)

(56) References Cited

U.S. PATENT DOCUMENTS

| 5,808,186 A * | 9/1998 | Matsumoto ......... F02D 41/1498 |
|---|---|---|
| | | 73/114.03 |
| 6,202,628 B1 | 3/2001 | Iwano et al. |

(Continued)

FOREIGN PATENT DOCUMENTS

| JP | 62-142859 A | 6/1987 |
|---|---|---|
| JP | 02-040056 A | 2/1990 |

(Continued)

OTHER PUBLICATIONS

Japanese Office Action (with English translation) issued in application No. 2012-207923, dated Sep. 1, 2015.

(Continued)

*Primary Examiner* — Marguerite McMahon
(74) *Attorney, Agent, or Firm* — Foley & Lardner LLP

(57) ABSTRACT

The present invention relates to a control device and a control method for an internal combustion engine equipped with a variable compression ratio mechanism. The control device sets an air charging efficiency as an engine load equivalent value and performs setting of a determination value used for misfire diagnosis, setting of an ignition timing, an estimation of a catalyst temperature, or the like. In the control device, when a compression ratio is higher than the basic compression ratio, and the theoretical thermal efficiency is high, the air charging efficiency is corrected to be increased, to perform the control on the basis of the corrected air charging efficiency. Furthermore, in a torque control that sets a target air charging efficiency on the basis of a torque command value, when the compression ratio is (Continued)

higher than the basic compression ratio, the target air charging efficiency is reduced.

2 Claims, 19 Drawing Sheets

(51) Int. Cl.
*F02P 5/152* (2006.01)
*F02P 5/153* (2006.01)
*F02D 13/02* (2006.01)
*F02D 41/00* (2006.01)
*F02D 41/14* (2006.01)

(52) U.S. Cl.
CPC ............... *F02P 5/152* (2013.01); *F02P 5/153* (2013.01); *F02D 41/1447* (2013.01); *F02D 2041/001* (2013.01); *F02D 2200/0411* (2013.01); *F02D 2200/0804* (2013.01); *F02D 2200/101* (2013.01); *F02D 2200/1015* (2013.01); *F02D 2250/18* (2013.01); *Y02T 10/12* (2013.01); *Y02T 10/18* (2013.01); *Y02T 10/42* (2013.01); *Y02T 10/46* (2013.01)

(58) Field of Classification Search
CPC ....... F02D 2200/0804; F02D 2200/101; F02D 41/1447; F02D 2200/1015; F02P 5/152; F02P 5/153; Y02T 10/12; Y02T 10/42
USPC .................. 123/48 R–48 D, 78 R–78 F, 114
See application file for complete search history.

(56) References Cited

U.S. PATENT DOCUMENTS

| 2004/0112334 | A1 | 6/2004 | Wenzler |
| 2005/0090968 | A1* | 4/2005 | Sato ........................ G01M 15/11 701/114 |
| 2006/0142926 | A1 | 6/2006 | Yasui et al. |
| 2007/0266974 | A1 | 11/2007 | Yasui et al. |
| 2008/0314368 | A1* | 12/2008 | Mayenburg ............. F02D 15/02 123/48 B |
| 2009/0107224 | A1* | 4/2009 | Katayama ............... G01M 15/11 73/114.04 |
| 2009/0107467 | A1* | 4/2009 | Berger .................... F02D 15/04 123/48 B |
| 2010/0180869 | A1 | 7/2010 | Akihisa et al. |
| 2011/0005207 | A1 | 1/2011 | Akihisa et al. |
| 2011/0005496 | A1* | 1/2011 | Hiraya .................... F02D 15/02 123/48 B |
| 2011/0041810 | A1* | 2/2011 | Nakasaka ........... F02D 13/0246 123/48 C |
| 2013/0055990 | A1* | 3/2013 | Kamada ................. F02D 15/00 123/48 R |

FOREIGN PATENT DOCUMENTS

| JP | 09-032625 | A | 2/1997 |
| JP | 2002-276446 | A | 9/2002 |
| JP | 2003-172112 | A | 6/2003 |
| JP | 2004-526096 | A | 8/2004 |
| JP | 2005-030222 | A | 2/2005 |
| JP | 3627532 | B2 | 3/2005 |
| JP | 2005-180231 | A | 7/2005 |
| JP | 2006-161583 | A | 6/2006 |
| JP | 2006-183644 | A | 7/2006 |
| JP | 2008-223501 | A | 9/2008 |
| JP | 2009-019593 | A | 1/2009 |
| JP | 2009-047010 | A | 3/2009 |
| JP | 2009-250163 | A | 10/2009 |
| JP | 2011-043097 | A | 3/2011 |
| JP | 2011-106370 | A | 6/2011 |
| WO | WO 2009/060997 | A1 | 5/2009 |

OTHER PUBLICATIONS

Japanese Patent Office Action dated Jun. 20, 2017 in Application No. 2016-223171 with its partial English translation thereof.

* cited by examiner

FIG. 2

TORQUE RATIO DUE TO COMPRESSION RATIO

| COMPRESSION RATIO | TORQUE RATIO | THEORETICAL THERMAL EFFICIENCY | FRICTION CORRECTION COEFFICIENT | COOLING LOSS CORRECTION COEFFICIENT |
|---|---|---|---|---|
| 8 | 1.00 | 0.56 | 1 | 1 |
| 9 | 1.03 | 0.58 | 0.996 | 0.997 |
| 10 | 1.05 | 0.60 | 0.991 | 0.994 |
| 11 | 1.07 | 0.62 | 0.987 | 0.991 |
| 12 | 1.08 | 0.63 | 0.983 | 0.989 |
| 13 | 1.10 | 0.64 | 0.979 | 0.986 |
| 14 | 1.11 | 0.65 | 0.974 | 0.983 |
| 15 | 1.11 | 0.66 | 0.97 | 0.98 |

FIG. 9A

① BOUNDARY LOAD IN BASIC TARGET
(MAXIMUM) COMPRESSION RATIO

| ENGINE ROTATIONAL SPEED | | | | | | | | |
|---|---|---|---|---|---|---|---|---|
| AIR CHARGING EFFICIENCY (≈) TP | | | | | | | A | |

FIG. 9B

② BOUNDARY LOAD IN BASIC TARGET
(MINIMUM) COMPRESSION RATIO

| ENGINE ROTATIONAL SPEED | | | | | | | | |
|---|---|---|---|---|---|---|---|---|
| AIR CHARGING EFFICIENCY (≈) TP | | | | | | | B | |

CONTROL DEVICE FOR INTERNAL COMBUSTION ENGINE

TECHNICAL FIELD

The present invention relates to a control device and to a control method for an internal combustion engine equipped with a variable compression ratio mechanism.

BACKGROUND ART

Patent Document 1 discloses a control device for an internal combustion engine that calculates a required torque depending on an accelerator operation quantity, calculates an opening area of a throttle valve on the basis of the required torque, converts the opening area into a target opening, and controls the opening of the electronic control throttle, depending on the target opening.

REFERENCE DOCUMENT LIST

Patent Document

Patent Document 1: Japanese Patent No. 3627532

SUMMARY OF THE INVENTION

Problems to be Solved by the Invention

In an internal combustion engine equipped with a variable compression ratio mechanism, even if a quantity of intake air, in other words, an air charging efficiency is constant, the theoretical thermal efficiency is altered by a change in compression ratio, and a generated torque is changed. For this reason, when controlling an engine by estimating the generated torque on the basis of the quantity of intake air, or when controlling the quantity of intake air on the basis of the requirements of the generated torque, there is a case in which control accuracy decreases according to the compression ratio.

The present invention has been made in view of the above-described problems, and an object thereof is to provide a control device and a control method capable of reducing a decline in control accuracy even if the compression ratio is changed, in an internal combustion engine equipped with a variable compression ratio mechanism.

Means for Solving the Problems

For that reason, according to the present invention, at least one of a control of an engine load and a control according to the engine load is changed depending on a compression ratio that is variable by the variable compression ratio mechanism.

Effects of the Invention

According to the invention, it is possible to perform the control according to a change in theoretical thermal efficiency due to a change in the compression ratio, and it is possible to prevent the control accuracy from being reduced due to the change in the compression ratio.

BRIEF DESCRIPTION OF THE DRAWINGS

FIG. 2 is a table illustrating the relationship between a compression ratio and a torque ratio in the embodiment of the present invention.

FIGS. 9A and 9B are diagrams illustrating a positive torque determination value table for each basic compression ratio in the embodiment of the present invention.

MODE FOR CARRYING OUT THE INVENTION

An embodiment of the present invention will be described below.

Figure 1:
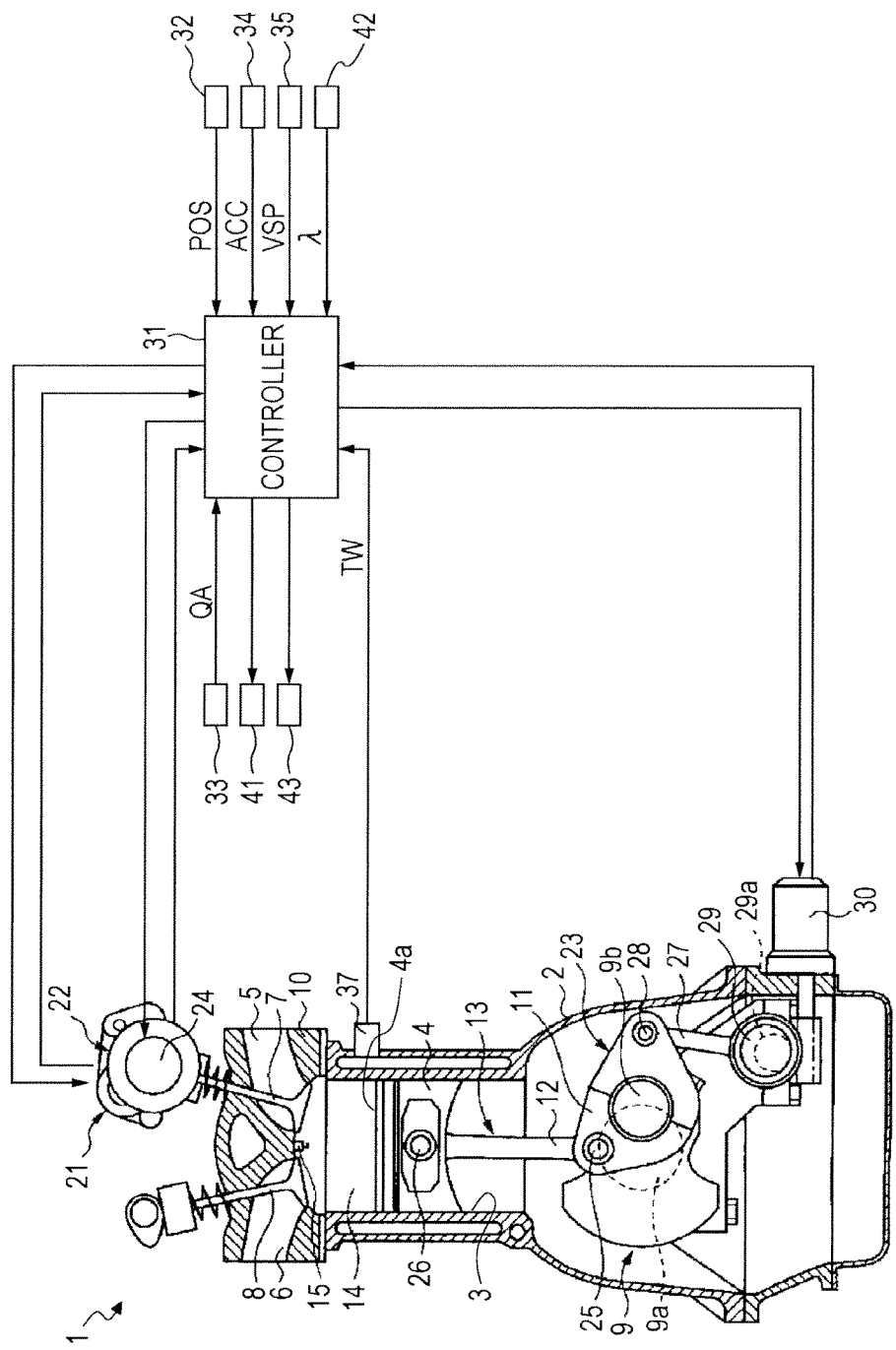
FIG. 1 is a system diagram of an internal combustion engine according to an embodiment of the present invention.

FIG. 1 illustrates an example of a vehicle internal combustion engine to which a control device according to the present invention is applied.

An internal combustion engine 1 is equipped with a cylinder block 2, a piston 4 provided in a cylinder bore 3 formed in cylinder block 2, a cylinder head 10 in which an intake port 5 and an exhaust port 6 are formed, a pair of intake valves 7, 7 and exhaust valves 8, 8 provided for each cylinder to open and close opening ends of intake ports 5 and exhaust ports 6.

Piston 4 is connected with respect to a crank shaft 9 via a connecting rod 13 having a lower link 11 and an upper link 12.

Moreover, a combustion chamber 14 is formed between a crown surface 4a of piston 4 and the lower surface of cylinder head 10. A spark plug 15 is provided at substantially the center of cylinder head 10 that forms combustion chamber 14.

Furthermore, engine 1 is equipped with a variable valve lift mechanism 21 that can vary a quantity of valve lift and an operation angle of intake valves 7, 7, a variable valve timing mechanism 22 that can vary phases of the opening periods of intake valves 7, 7 with respect to crank shaft 9, and a variable compression ratio mechanism 23 that can vary the compression ratio by changing a top dead center position of piston 4.

For example, as disclosed in Japanese Patent Application Laid-open Publication No. 2003-172112, variable valve lift mechanism 21 is a mechanism that increases or decreases the quantity of the maximum valve lift of intake valves 7, 7, by changing the angular position of the control shaft by an actuator such as an electric motor, and increases or decreases the operating angle in conjunction with the increase or decrease of the related quantity of maximum valve lift.

Furthermore, variable valve timing mechanism 22 is a mechanism that sets the central phase of the operating angle to an advance angle and a delay angle, while keeping the constant operating angle of intake valves 7, 7, by changing the phase of intake camshaft 24 with respect to crank shaft 9.

Variable compression ratio mechanism 23 has a function that can vary the compression ratio of internal combustion engine 1 by changing the top dead center position of piston 4, for example, by a structure as disclosed in Japanese Patent Application Laid-open Publication No. 2002-276446, and an example of the structure of variable compression ratio mechanism 23 will be described below.

Crank shaft 9 is equipped with a plurality of journal portions 9a and crank pin portions 9b, and journal portion 9a is rotatably supported on a main bearing of cylinder block 2.

Crank pin portion 9b is eccentric from journal portion 9a, and lower link 11 is rotatably connected thereto.

Lower link 11 is configured by two divided parts, and crank pin portion 9b is fitted to a connecting hole provided substantially at the center.

A lower end side of upper link 12 is pivotally connected to one end of lower link 11 by a connecting pin 25, and an upper end side thereof is pivotally connected to piston 4 by a piston pin 26.

An upper end side of control link 27 is pivotally connected to the other end of lower link 11 by a connecting pin 28, and a lower end side thereof is pivotally connected to the lower portion of cylinder block 2 via a control shaft 29.

Specifically, control shaft 29 is rotatably supported on cylinder block 2 and has an eccentric cam portion 29a, which is eccentric from the rotation center, and the lower end portion of control link 27 is rotatably fitted to eccentric cam portion 29a.

A rotational position of control shaft 29 is controlled by a compression ratio control actuator 30 using an electric motor.

In variable compression ratio mechanism 23 that uses the multi-link type piston-crank mechanism as described above, when control shaft 29 is rotated by compression ratio control actuator 30, the central position of eccentric cam portion 29a, that is, the relative position to cylinder block 2 is changed.

Thus, a swinging support position of the lower end of control link 27 is changed, and when the swinging support position of control link 27 is changed, the stroke of piston 4 is changed, the position of piston 4 at the piston top dead center TDC becomes higher or lower, and the compression ratio of engine 1 is changed.

Also, an intake system of internal combustion engine 1 is provided with an electronic control throttle 41, which adjusts the quantity of intake air of internal combustion engine 1 by changing the opening area of the intake system.

Variable valve lift mechanism 21, variable valve timing mechanism 22, variable compression ratio mechanism 23, an electronic control throttle 41, a para-transistor 43 configured to control the current flowing through a primary side of an ignition coil and the like are controlled by a control device 31 equipped with a computer.

Signals from various sensors configured to detect the operating conditions of internal combustion engine 1 are input to control device 31.

As various sensors configured to detect the operating conditions of internal combustion engine 1, other than air-fuel ratio sensor 42, a crank angle sensor 32 configured to output a pulse signal POS in synchronization with rotation of the engine, an air flow sensor 33 that outputs a signal QA indicating the intake air flow rate of internal combustion engine 1, an accelerator opening sensor 34 configured to output a signal ACC indicating an amount of depression of the accelerator pedal (accelerator opening), a vehicle speed sensor 35 configured to output a signal VSP indicating a traveling speed (vehicle speed) of a vehicle having internal combustion engine 1 mounted thereon, a water temperature sensor 37 configured to output a signal TW indicating a cooling water temperature (engine temperature) of internal combustion engine 1, an air-fuel ratio sensor 42 configured to detect the air-fuel ratio (excess air ratio $\lambda$) via the oxygen concentration in the exhaust gas, and the like are provided.

The contents of the control using control device 31 will be described in detail below.

Misfire Diagnosis

Control device 31 has a misfire diagnosis function that detects the presence or absence of a misfire in internal combustion engine 1.

In the related misfire determination, for example, the rotational speed of the engine is calculated at a predetermined cycle based on the pulse signal POS, and when an absolute value of the deviation between an average value and a maximum value or a minimum value in the determination period of the rotational speed of the engine is equal to or greater than a determination value SL, it is determined that a misfire has occurred.

In addition, as the parameters used for the misfire determination, it is possible to use a parameter indicating of the rotation fluctuation and torque fluctuation accompanied by misfire, without being limited to the above-described deviation.

Here, the rotation fluctuation and the torque fluctuation accompanied by the misfire fluctuates depending on the engine load and the rotational speed of the engine, even when there is no misfire, the fluctuations decrease at the time of high-rotation and low-load of internal combustion engine 1 and increases at the time of low-rotation and high-load. Thus, control device 31 distinguishes the amount of the fluctuation due to the misfire and the amount of the fluctuation due to the operating conditions, by changing the determination value depending on the engine load and the rotational speed of the engine.

Control device 31 obtains an air charging efficiency or an air charging efficiency equivalent value, as a quantity of state indicating the engine load, but as illustrated in FIG. 2, even if the air charging efficiency is the same, as the compression ratio becomes higher, the torque becomes greater. Accordingly, even if misfire determination value SL is set from the air charging efficiency, in some cases, it may be deviated from the value adapted to the actual torque values.

That is, the theoretical thermal efficiency, the friction, the cooling loss, or the like, is changed by the change in the compression ratio, and even under the conditions that the air charging efficiency is the same, the torque may be different. Thus, for example, when determining the relationship among the air charging efficiency, the rotational speed of the engine and determination value SL so as to be suitable for the conditions of the maximum compression ratio, in the case of performing the misfire determination under the condition of a compression ratio lower than the maximum compression ratio, the torque is underestimated to perform the misfire determination based on determination value SL adapted to the torque less than the actual torque, and there is a possibility of erroneously determining the presence or absence of the misfire.

Furthermore, the maximum compression ratio and the minimum compression ratio are a maximum value and a minimum value of the compression ratio, respectively, that define a change range of the compression ratio that is variable in variable compression ratio mechanism 23 or a control range that is set within the change range.

Therefore, control device 31 performs the process of changing misfire determination value SL depending on the compression ratio, in the setting of misfire determination value SL according to the engine load as a control according to the engine load, sets misfire determination value SL adapted to the actual torque even if there is a change in the compression ratio, and allows the accurate misfire diagnosis.

Figure 3:
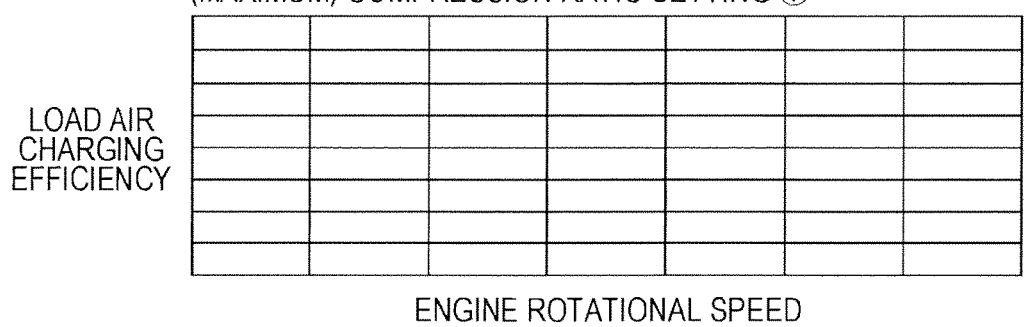
FIG. 3 is a diagram illustrating a misfire determination value map in the embodiment of the present invention.

As an example of a process of changing misfire determination value SL depending on the compression ratio, control device 31 previously sets the determination value map (see FIG. 3) or function for setting basic determination value SLs from the air charging efficiency and the rotational speed of the engine so as to be suitable for a case of the basic compression ratio, for example, the maximum compression ratio, and changes basic determination value SLs, which is set based on the map or the function, depending on the compression ratio.

Control device 31 performs the changes of basic determination value SLs depending on the compression ratio, for example, according to the following Formulas (1) and (2).

misfire determination value $SL$=basic determination value $SLs \times$(torque ratio at the current compression ratio/torque ratio at the basic compression ratio)    Formula (1)

torque ratio=theoretical thermal efficiency×friction correction coefficient×cooling loss correction coefficient    Formula (2)

As illustrated in FIG. 2, the theoretical thermal efficiency increases as the compression ratio becomes higher. Even when considering the influence of the friction and the cooling loss, when the air charging efficiency and the rotational speed of the engine are the same, the torque increases as the compression ratio becomes higher. With respect to the torque of the basic compression ratio, the torque increases as the compression ratio becomes higher.

Meanwhile, it is necessary to increase misfire determination value SL with respect to an increase in the torque and to decrease misfire determination value SL with respect to a decrease in the torque. Therefore, by multiplying "torque ratio at the current compression ratio/torque ratio at the basic compression ratio" by basic determination value SLs, control device 31 sets the result obtained by the increased correction of basic determination value SLs to misfire determination value SL, when the basic compression ratio is not the maximum compression ratio and the compression ratio is higher than the basic compression ratio. Whereas, control device 31 sets the result obtained by the decreased correction of basic determination value SLs to misfire determination value SL, when the compression ratio is smaller than the basic compression ratio.

In addition, for example, when the basic compression ratio is set to the maximum compression ratio, "torque ratio at the current compression ratio/torque ratio at the basic compression ratio" is set to a value of 1 or less, and misfire determination value SL will be variably set in accordance with the compression ratio in the range below basic determination value SLs.

In the above, the torque ratio for each compression ratio is retrieved from the table illustrated in FIG. 2, and "torque ratio at the current compression ratio/torque ratio at the basic compression ratio" is computed as the correction coefficient to correct basic determination value SLs. However, since the torque ratio at the basic compression ratio becomes a constant value, control device 31 can convert the compression ratio when performing the misfire determination into the correction coefficient, thereby correcting basic determination value SLs by the correction coefficient.

Also, as a process of changing misfire determination value SL depending on the compression ratio, control device 31 can use the interpolation operation.

Figure 4A:
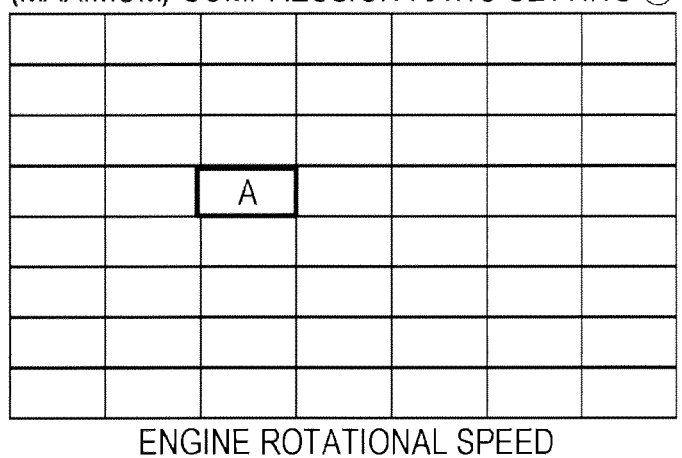
FIGS. 4A and 4B are diagrams illustrating a map used for an interpolation operation of the misfire determination value in the embodiment of the present invention.
Figure 4B:
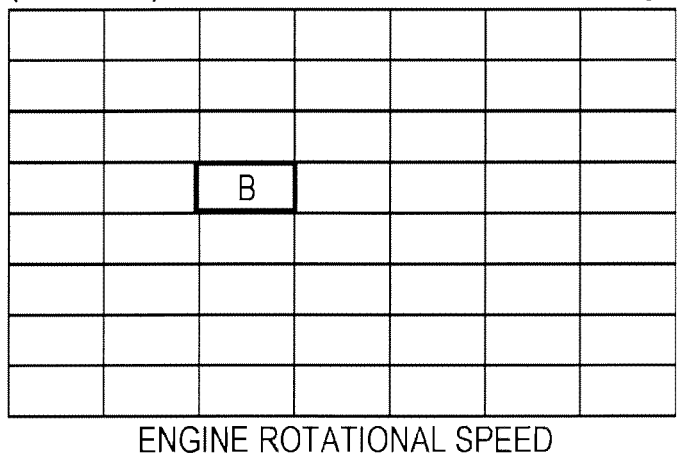

For example, as illustrated in FIGS. 4A and 4B, control device 31 has a first map adapted to a case in which the compression ratio is the maximum compression ratio and a second map adapted to a case in which the compression ratio is the minimum compression ratio, as the determination value map for setting misfire determination value SL from the air charging efficiency and the rotational speed of the engine.

Moreover, control device 31 obtains misfire determination value SL corresponding to the compression ratio at the time when performing the misfire determination, by the interpolation operation between the misfire determination value SL (1) retrieved from the first map and the misfire determination value SL (2) retrieved from the second map.

For example, when the maximum compression ratio is 11 and the minimum compression ratio is 9, misfire determination value SL at the time when the compression ratio is 10 becomes an arithmetical average value between misfire determination value SL (A) obtained from the first map and the misfire determination value SL (B) obtained from the second map (arithmetical average value=(misfire determination value SL (A)+misfire determination value SL (B))/2).

Furthermore, in the interpolation operation, it is possible to obtain misfire determination value SL corresponding to the compression ratio at that time by the interpolation operation, from misfire determination value SL corresponding to each of three or more basic compression ratios.

Figure 5:
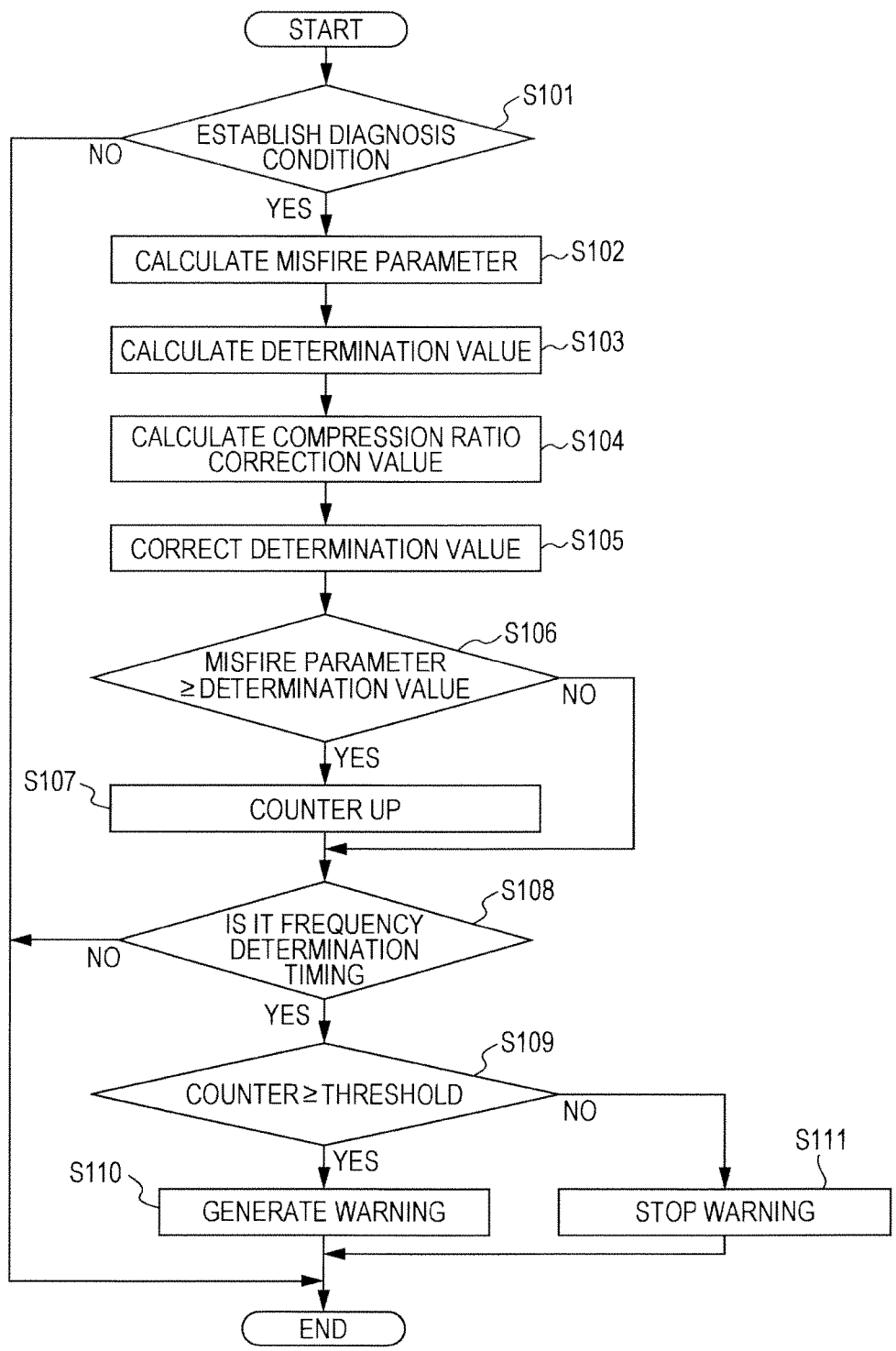
FIG. 5 is a flowchart illustrating the flow of a misfire diagnosis process in the embodiment of the present invention.

The flowchart of FIG. 5 illustrates an example of a misfire detection process through control device 31.

First, in step S101, control device 31 determines whether the conditions for carrying out the misfire diagnosis are satisfied. The conditions determined by control device 31 in step S101 are such that, for example, the warm-up of internal combustion engine 1 is completed, a fault of a sensor such as a crank angle sensor 32 is not detected, internal combustion engine 1 generates a positive torque, that is, the vehicle is in a driven state driven by the output of internal combustion engine 1.

If there is a condition capable of performing the misfire diagnosis, the process proceeds to step S102, and control device 31 calculates the misfire parameter that is a quantity of state that varies with the presence or absence of the misfire.

The misfire parameter is, for example, a deviation between the average value and the maximum or minimum value of the rotational speed of the engine in the determination period, and is a value indicating that the rotational fluctuation of internal combustion engine 1, that is to say, the torque fluctuation increases, as the absolute value of the deviation increases.

Next, in step S103, control device 31 calculates misfire determination value SL to be compared with the misfire parameter, from the air charging efficiency and the rotational speed of the engine representing the engine load.

Furthermore, in step S104, control device 31 calculates a correction value for correcting misfire determination value SL calculated in step S103, in accordance with the compression ratio at that time.

Furthermore, as the compression ratio at that time, it is possible to use a target compression ratio, or an actual compression ratio that is detected, for example, as a rotational position of control shaft 29.

In step S105, control device 31 calculates a final misfire determination value SL corresponding to the compression ratio at that time, by correcting misfire determination value SL calculated in step S103 by the correction value calculated in step S104.

Here, final misfire determination value SL calculated in step S105 is set to a greater value as the compression becomes greater, in other words, a value that determines an occurrence of misfire in the greater rotational fluctuation, in response to an increase in torque according to an increase in the compression ratio, when the air charging efficiency and the rotational speed of the engine are constant.

In step S106, control device 31 determines the presence or absence of a misfire, by comparing the misfire parameters with misfire determination value SL. In other words, control device 31 determines that a misfire has occurred when the misfire parameters are misfire determination value SL or more, and the rotational fluctuation of internal combustion engine 1 is greater than the reference value. On the other hand, control device 31 determines that no misfire has occurred, when the misfire parameters are less than misfire determination value SL, and the rotational fluctuation of internal combustion engine 1 is less than the reference value.

When determining that the misfire has occurred in step S106, the process proceeds to step S107 and control device 31 increases the value of the misfire counter for counting the number of times of determining that the misfire has occurred, and when determining that no misfire has occurred in step S106, the process proceeds to step S108 by bypassing step S107.

In step S108, control device 31 determines whether one cycle period of determining the misfire frequency has elapsed, for example, based on whether the cumulative rotational speed of internal combustion engine 1 becomes a threshold value.

The optimum threshold value varies depending on which defects generated with the misfire are targeted, such as worsening of exhaust properties due to an occurrence of misfire, and damage to the exhaust system components due to the fuel combustion in the exhaust system by misfire.

When it is determined that it is timing of determining the misfire frequency in step S108, the process proceeds to step S109, control device 31 determines whether the value of the misfire counter is the set value or more, and determines whether the misfire frequency as the number of times of misfire per number of times of ignition exceeds the allowable maximum value.

When the value of the misfire counter is equal to or greater than the set value, and the misfire frequency exceeds the allowable maximum value, the process proceeds to step S110, and control device 31 performs warning of the misfire occurrence, for example, by turning on warning lights.

Furthermore, control device 31 is able to warn of the occurrence of misfire and perform the control change of internal combustion engine 1. For example, when the misfire occurs, control device 31 is able to limit a maximum load of internal combustion engine 1 to be lower than the time of non-misfire, or to prohibit the combustion at an air-fuel ratio lower than the theoretical air-fuel ratio.

On the other hand, when the value of the misfire counter is less than the threshold value and the misfire frequency is lower than the allowable maximum value, the process proceeds to step S111, and control device 31 stops warning of the misfire occurrence.

Figure 6:
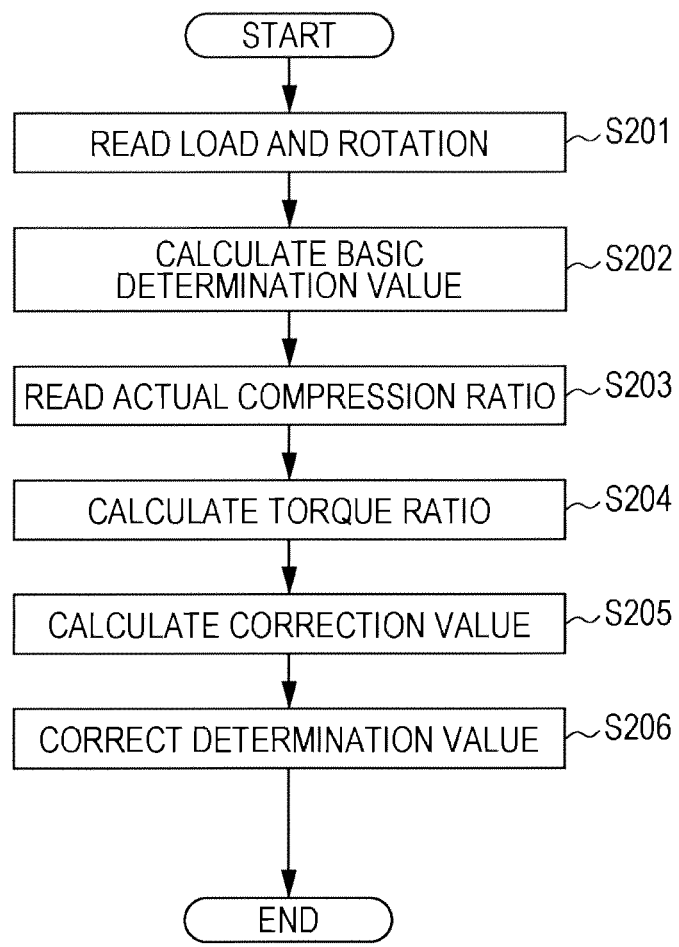
FIG. 6 is a flowchart illustrating the correction process according to the compression ratio of the misfire determination value in the embodiment of the present invention.

The flowchart of FIG. 6 is an example of the process content of step S103 to step S105 and illustrates a flow of a process of correcting misfire determination value SL depending on the torque ratio.

In the flowchart of FIG. 6, first, in step S201, control device 31 reads the measured values of the air charging efficiency and the rotational speed of the engine.

Control device 31 is able to use a quantity of cylinder intake air as a quantity of state indicating the air charging efficiency. The quantity of cylinder intake air can be calculated from the intake air flow rate measured by air flow sensor 33 and the rotational speed of the engine, and can be calculated from the throttle opening or the intake negative pressure and the rotational speed of the engine. Furthermore, control device 31 can use the fuel injection pulse width, which is calculated based on the quantity of cylinder intake air, as a quantity of state indicating the air charging efficiency.

At the next step S202, control device 31 retrieves a basic determination value SLs corresponding to the air charging efficiency and the rotational speed of the engine that were read in step S201, by referring to a map that stores basic determination value SLs to correspond to the air charging efficiency and the rotational speed of the engine.

The map of basic determination value SLs referenced by control device 31 in step S202 is a map that is suitable for a case in which the compression ratio is the basic compression ratio.

In step S203, control device 31 reads the compression ratio at that time. The compression ratio at that time is a target compression ratio or an actual compression ratio at that time.

In step S204, control device 31 calculates the torque ratio in the basic compression ratio, and the torque ratio in the compression ratio at that time.

In step S205, control device 31 calculates a correction value for correcting the basic determination value SLs, from the torque ratio in the basic compression ratio, and the torque ratio in the compression ratio at that time.

Correction value=torque ratio at the current compression ratio/torque ratio at the basic compression ratio In step S206, control device 31 corrects basic determination value SLs obtained in step S202 by the correction value obtained in step S205, and sets the correction result to final misfire determination value SL.

Control device 31 compares misfire determination value SL calculated at this step S206 with the misfire parameter in step S106 of the flowchart of FIG. 5.

As a process of changing misfire determination value SL depending on the compression ratio, it is possible to use an interpolation operation as described above. A flowchart in FIG. 7 illustrates an example of a setting process of misfire determination value SL through the interpolation operation implemented by control device 31.

Figure 7:
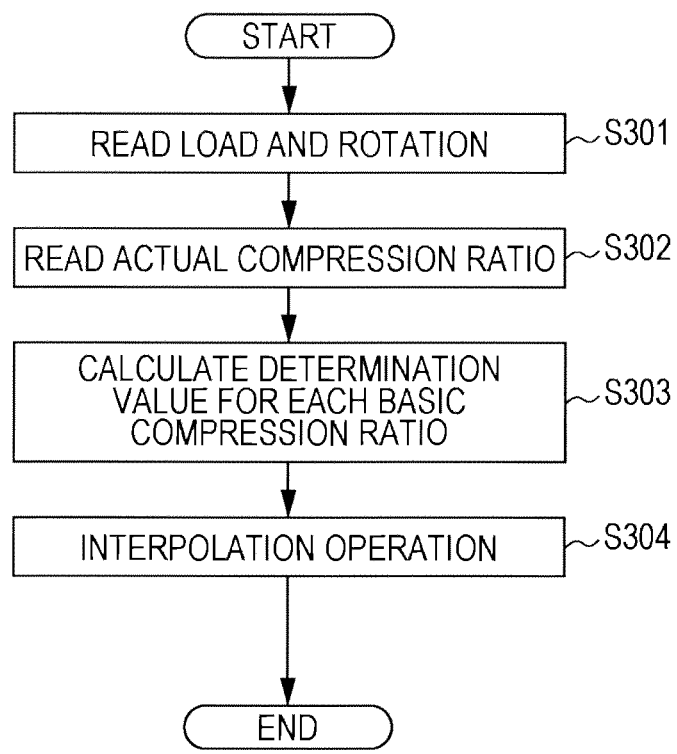
FIG. 7 is a flowchart illustrating a process that obtains the misfire determination value in the embodiment of the present invention by the interpolation operation.

In the flowchart of FIG. 7, first, in step S301, similarly to step S201, control device 31 reads the measured values of the air charging efficiency and the rotational speed of the engine.

In step S302, control device 31 reads the compression ratio at that time.

In step S303, control device 31 retrieves misfire determination value SL corresponding to the air charging efficiency and the rotational speed of the engine, which were read in step S301, from the determination value map.

As a determination value map referred in step S303, control device 31 previously stores a first map suitable for a first basic compression ratio (for example, the maximum compression ratio) and a second map suitable for a second basic compression ratio (for example, the minimum compression ratio). Here, the first basic compression ratio is, for example, the maximum compression ratio, and the second basic compression ratio is, for example, the minimum compression ratio.

In step S303, control device 31 retrieves the misfire determination values SL corresponding to the air charging efficiency and the rotational speed of the engine which were read in step S301, by referring to both the first map and the second map.

In step S304, control device 31 obtains misfire determination value SL corresponding to the compression ratio at that time by interpolation operation, from misfire determination value SL (1) suitable for the first basic compression ratio retrieved from the first map, and misfire determination value SL (2) suitable for the second basic compression ratio retrieved from the second map.

Control device 31 compares misfire determination value SL calculated at this step S306 with the misfire parameter in step S106 of the flowchart of FIG. 5.

As described above, misfire determination value SL, which has been changed on the basis of the air charging efficiency and the rotational speed of the engine, is further changed depending on the compression ratio, and accordingly, even if the compression ratio is changed, it is possible to set misfire determination value SL suitable for the actual torque, thereby accurately performing the misfire diagnosis.

In the above-described misfire diagnosis, control device 31 is adapted to perform the diagnosis, when internal combustion engine 1 is determined to generate a positive torque in step S101.

Here, when control device 31 determines whether there is a state of occurrence of a positive torque on the basis of the air charging efficiency and the rotational speed of the engine, since the positive torque area changes by the compression ratio, there is a possibility that, in some cases, the diagnosis is performed in a state of negative torque in which internal combustion engine 1 is driven from the axle side by a deceleration driving, or the misfire diagnosis is not performed in spite of the state of occurrence of the positive torque.

Figure 8:
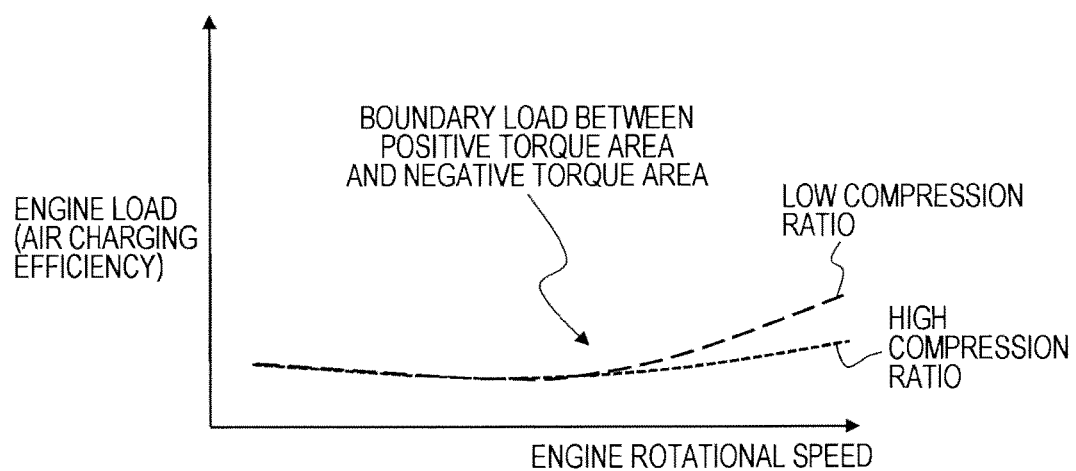
FIG. 8 is a diagram illustrating the relationship between the compression ratio and a positive torque area in the embodiment of the present invention.

FIG. 8 illustrates an example of the difference between the positive torque areas due to the difference in compression ratio.

As illustrated in FIG. 8, when compared at the same rotational speed of the engine, in the high rotational speed area in which the rotational speed of the engine exceeds the threshold value, in the case of the low compression ratio, the air charging efficiency as the positive torque is higher than in the case of a high compression ratio, and a part of the positive torque area at a high compression ratio is switched to a negative torque area at a low compression ratio.

Therefore, control device 31 determines whether there is a state of occurrence of the positive torque as a control according to the engine load, on the basis of the air charging efficiency, the rotational speed of the engine, and the compression ratio.

Control device 31 stores, for example, the first table (see FIG. 9A) adapted to the case of the maximum compression ratio, and the second table (see FIG. 9B) adapted to the case of the minimum compression ratio, as a table that stores the air charging efficiency, which defines a boundary between the positive torque area and the negative torque area for each rotational speed of the engine.

Control device 31 retrieves the air charging efficiency that is stored to correspond to the rotational speed of the engine at the time of misfire diagnosis, that is, the minimum air charging efficiency as the state of occurrence of the positive torque, from both the first table and the second table, and obtains a minimum air charging efficiency at the compression ratio at the time of misfire diagnosis by the interpolation operation, from minimum air charging efficiency A obtained from the first table and minimum air charging efficiency B obtained from the second table.

If there is a state of the air charging efficiency higher than the minimum air charging efficiency calculated in the manner described above, control device 31 allows a misfire diagnosis by determining that there is a state of occurrence of the positive torque. On the other hand, if there is a state of the air charging efficiency lower than the minimum air charging efficiency, control device 31 determines that there is a possibility of the state of occurrence of the negative torque, in other words, a deceleration state, and prohibits the misfire diagnosis.

Thus, even if the compression ratio is changed, it is possible to accurately determine whether there is a state of occurrence of the positive torque, it is possible to prevent the diagnosis from being erroneously performed in the state of negative torque, and it is possible to prevent the misfire diagnosis from being erroneously prohibited in the state of occurrence of the positive torque.

Figure 10:
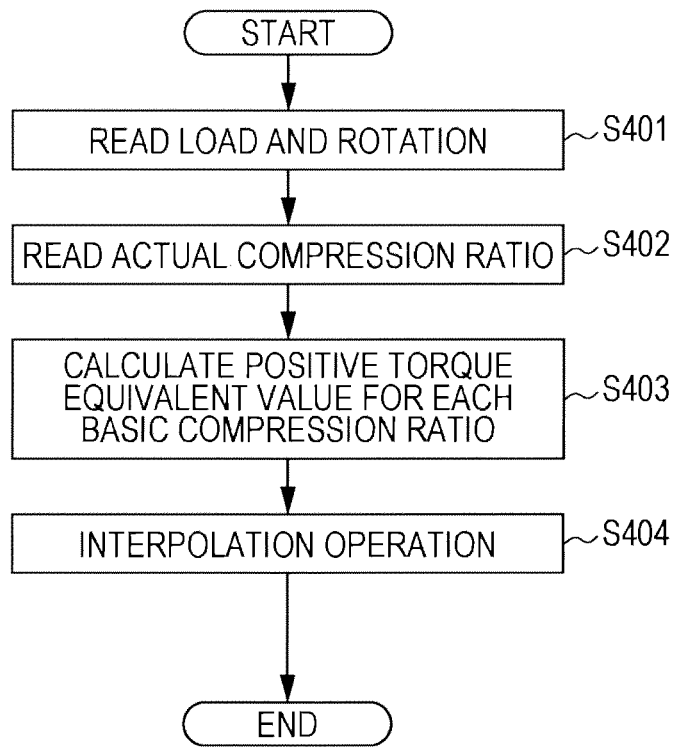
FIG. 10 is a flowchart illustrating a process that obtains a positive torque determination value in the embodiment of the present invention by the interpolation operation.

The flowchart of FIG. 10 illustrates the flow of the arithmetic process of the minimum air charging efficiency that is used to determine whether there is a state of occurrence of the positive torque.

In the flowchart of FIG. 10, in step S401, control device 31 reads the air charging efficiency and the rotational speed of the engine and, in step S402, control device 31 reads the compression ratio at that time.

Moreover, in step S403, control device 31 retrieves the minimum air charging efficiencies corresponding to the rotational speed of the engine at that time, by referring to both the first table adapted to the case of the maximum compression ratio and the second table adapted to the case of the minimum compression ratio, which are tables that store the minimum air charging efficiency which defines the boundary between the positive torque area and the negative torque area for each rotational speed of the engine.

In step S404, control device 31 obtains the minimum air charging efficiency corresponding to the compression ratio at that time by the interpolation operation, from the minimum air charging efficiency adapted to the case of the maximum compression ratio and the minimum air charging efficiency adapted to the case of the minimum compression ratio.

Here, the minimum air charging efficiency obtained in step S404 is the minimum value of the air charging efficiency which generates a positive torque in the rotational speed of the engine and the compression ratio at that time, and control device 31 allows the misfire diagnosis, by determining that there is a state of occurrence of the positive torque, when the actual air charging efficiency exceeds the minimum air charging efficiency.

Ignition Timing Control

Furthermore, as a control according to the engine load, control device 31 has an ignition timing control function that determines the ignition timing of internal combustion engine 1 depending on the engine operating conditions including the engine load, and performs the electric conduction control of para-transistor 43 depending on the determined ignition timing.

The optimum ignition timing varies depending on the internal pressure of cylinder and the rotational speed of the engine. Here, in the case of using the air charging efficiency as the quantity of state that represents the internal pressure of a cylinder, in internal combustion engine 1 equipped with variable compression ratio mechanism 23, the internal pressure of the cylinder is changed by a change in the compression ratio even at the same air charging efficiency.

Therefore, when determining the ignition timing from the measured value of the air charging efficiency without considering the change in the compression ratio, the ignition timing which does not correspond to the actual internal pressure of cylinder might be set, and the output performance or the like might be lowered.

Therefore, control device 31 sets the result, which is obtained by correcting the detected value of the air charging efficiency on the basis of the compression ratio, to the engine load used in determining the ignition timing, and determines the ignition timing based on the engine load and the rotational speed of the engine.

Setting of the engine load based on the air charging efficiency and the compression ratio is carried out according to the following Formula (3) as an example.

engine load=air charging efficiency×internal pressure ratio of cylinder×volumetric efficiency variation  Formula (3)

Figure 11A:
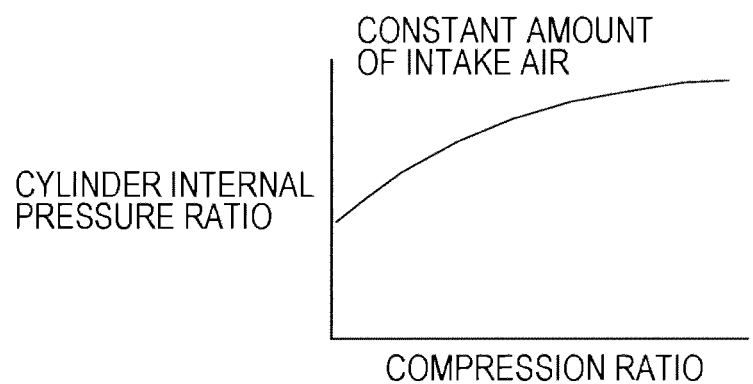
FIGS. 11A and 11B are diagrams illustrating correction characteristics of the engine load that is used to set the ignition timing in the embodiment of the present invention.

The internal pressure ratio of cylinder is a ratio of the internal pressure of cylinder at the basic compression ratio and the internal pressure of cylinder different from the basic compression ratio when the air charging efficiency is constant. Furthermore, as illustrated in FIG. 11A, since the internal pressure of a cylinder becomes greater by an increase in the compression ratio, as the compression ratio becomes higher, the internal pressure ratio of the cylinder is set to a greater value.

Figure 11B:
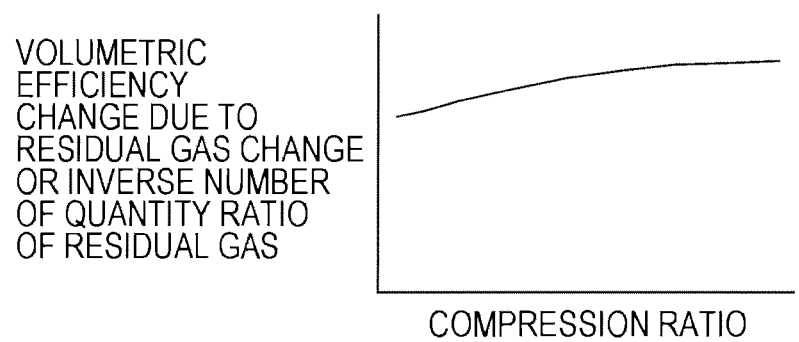

Moreover, the volumetric efficiency variation is a correction term for corresponding to the change in residual gas (volumetric efficiency) associated with the change in the compression ratio, the residual gas decreases by an increase in the compression ratio and the volumetric efficiency increases, and it is possible to set the ignition timing to the delay angle by a decrease in the residual gas as an inert gas. Accordingly, in order to correct the air charging efficiency in the increase direction of the engine load as a delay angle direction of the ignition timing, as illustrated in FIG. 11B, as the compression ratio becomes higher, the volumetric efficiency variation is set to a greater value.

Furthermore, the volumetric efficiency variation is an inverse number of the ratio of residual gas quantity, and as the quantity of residual gas decreases by an increase in the compression ratio, the air charging efficiency becomes greatly enlarged and corrected.

Figure 12:
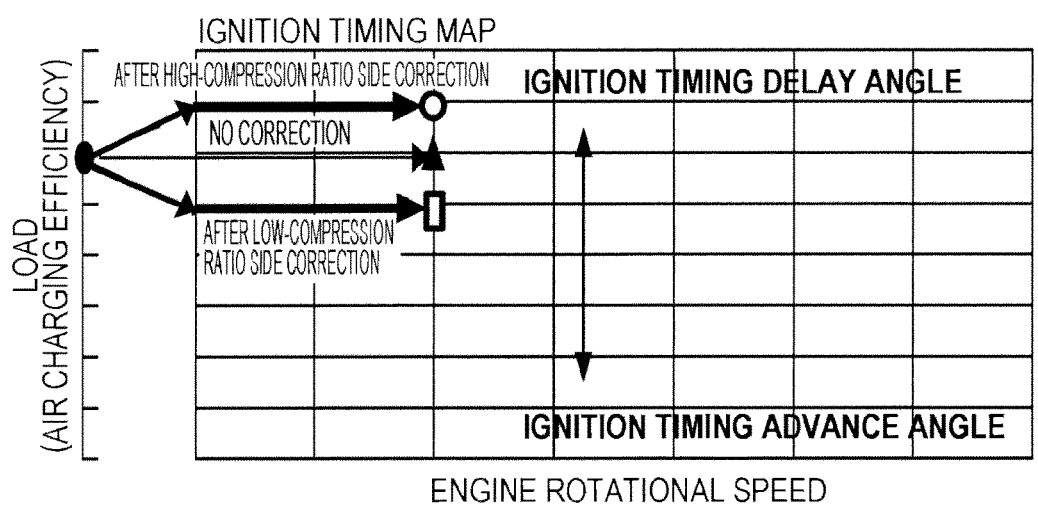
FIG. 12 is a diagram illustrating a difference in map search value (ignition timing) due to the correction of the engine load in the embodiment of the present invention.

As illustrated in FIG. 12, control device 31 includes an ignition timing map, which stores the ignition timing in response to the air charging efficiency and the rotational speed of the engine adapted to the case of the basic compression ratio, and sets the ignition timing, as described above, by referring to the ignition timing map based on the engine load calculated on the basis of the air charging efficiency, the internal pressure ratio of cylinder, and the volumetric efficiency variation.

Here, the ignition timing map is set to the characteristics of changing the ignition timing to the delay angle with respect to the increase in the internal pressure of cylinder, and when the internal pressure of cylinder increases by a rise in the compression ratio even if the air charging efficiency is the same, the ignition timing is set to the further delay angle side, and conversely, when the internal pressure of cylinder decreases by a fall in the compression ratio, the ignition timing is set to the further advance angle side.

Also, as a process of changing the ignition timing depending on the change in the compression ratio, it is possible to correct the ignition timing, which is set based on the air charging efficiency and the rotational speed of the engine, on the basis of the internal pressure ratio of a cylinder and the volumetric efficiency variation.

Figure 13:
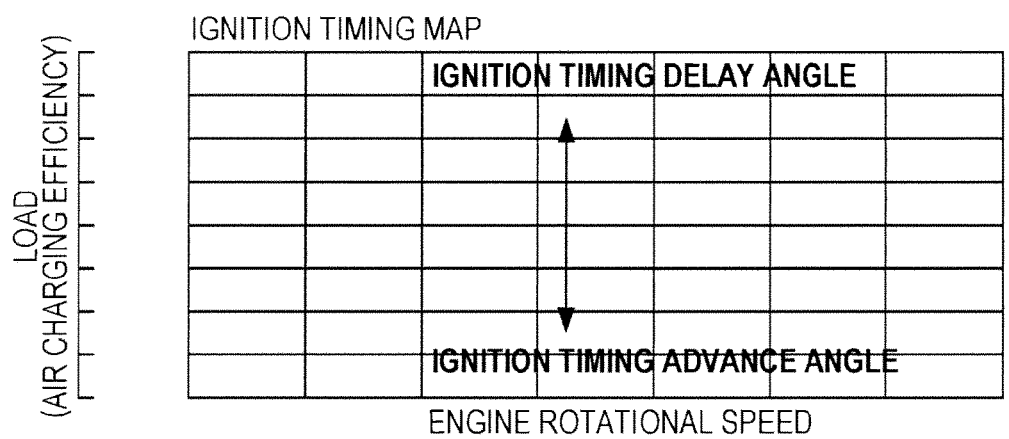
FIG. 13 is a diagram illustrating a map of basic ignition timing in the embodiment of the present invention.

In this case, in the ignition timing map (see FIG. 13) which is adapted to the case of the basic compression ratio, and stores the ignition timing corresponding to the air charging efficiency and the rotational speed of the engine, the basic ignition timing is set by referring to the air charging efficiency as the engine load.

Moreover, the final ignition timing is set by correcting the basic ignition timing according to Formula (4).

ignition timing=basic ignition timing×internal pressure ratio of cylinder×volumetric efficiency variation  Formula (4)

Here, the ignition timing is set as the advance angle value from the compression top dead center, and as the internal pressure of cylinder rises, it is required to set the ignition timing to the delay angle.

Figure 14A:
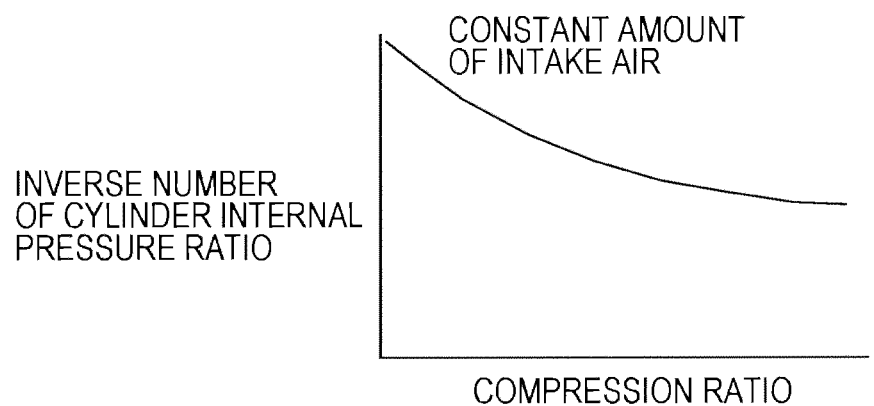
FIGS. 14A and 14B are diagrams illustrating the correction characteristics of the basic ignition timing in the embodiment of the present invention.
Figure 14B:
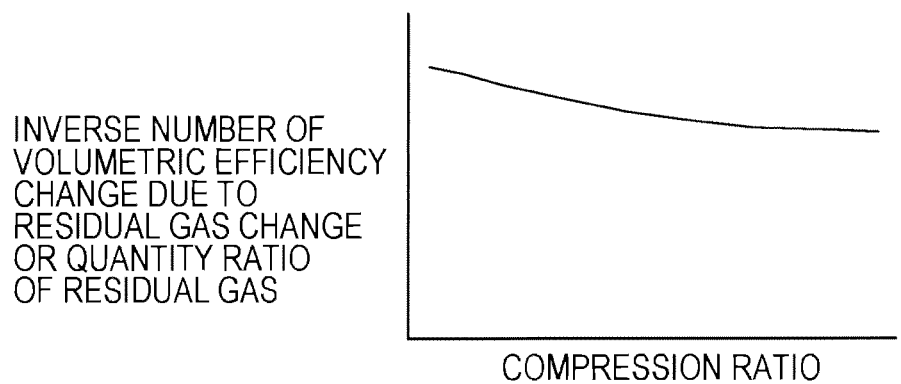

Therefore, as illustrated in FIGS. 14A and 14B, as the compression ratio rises, the internal pressure ratio of a cylinder and the volume efficiency variation are given as the smaller values, and as the compression ratio rises, the basic ignition timing is corrected to the further delay angle side.

As described above, the ignition timing is set depending on the change in the internal pressure of cylinder due to the change in the compression ratio and is changed to the delay angle side with respect to the increase in the internal pressure of cylinder due to the increase in the compression ratio, and accordingly, even if the compression ratio is changed by variable compression ratio mechanism 23, the ignition timing corresponding to the actual internal pressure of cylinder is set, and therefore, it is possible to enhance the output performance of internal combustion engine 1 as possible.

Estimation of Catalyst Temperature

Furthermore, as a control according to the engine load, control device 31 has a function of estimating the temperature of the exhaust purification catalyst provided in an exhaust system of internal combustion engine 1 on the basis of the engine load, and performs switching of the combustion mode, such as correction of ignition timing, purge control, and switching of stratified charge combustion/homogeneous combustion, on the basis of the estimated catalyst temperature.

In addition, the temperature of the exhaust purification catalyst is substantially equivalent to a temperature of the exhaust gas that passes through the exhaust purification catalyst.

Here, there are characteristics in which as the air charging efficiency rises, the catalyst temperature rises, and as the rotational speed of the engine rises, the catalyst temperature rises. However, even if the air charging efficiency is the same, when the compression ratio rises and the theoretical thermal efficiency rises, the catalyst temperature falls.

Therefore, when estimating the catalyst temperature from the air charging efficiency and the rotational speed of the engine, an error might be caused in the temperature estimation with the change in the compression ratio.

Therefore, control device 31 corrects the measured value of the air charging efficiency depending on the compression ratio, and estimates the catalyst temperature based on the corrected air charging efficiency.

Figure 15:
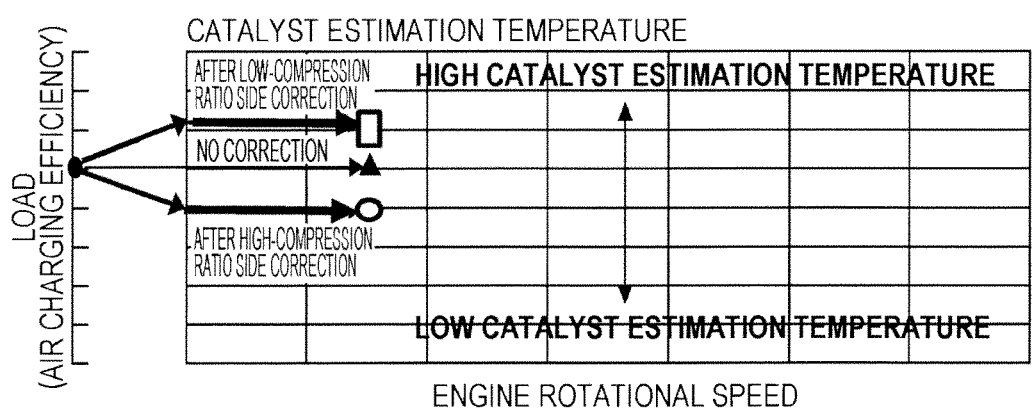
FIG. 15 is a diagram illustrating a difference in map search value (catalyst temperature) due to the correction of the engine load in the embodiment of the present invention.

As illustrated in FIG. 15, control device 31 is provided with a catalyst temperature map that stores the catalyst temperature in response to the air charging efficiency and the rotational speed of the engine as a quantity of state that represents the engine load, and the catalyst temperature map is adapted to a case in which the compression ratio is the basic value.

Moreover, when retrieving the catalyst temperature by referring to the catalyst temperature map, control device 31 corrects the measured value of the air charging efficiency depending on the compression ratio, and retrieves the catalyst temperature corresponding to the corrected air charging efficiency from the catalyst temperature map.

The correction of the air charging efficiency according to the compression ratio is performed according to Formula (5).

$$\text{engine load} = \text{air charging efficiency} \times \text{exhaust temperature ratio} \quad \text{Formula (5)}$$

Figure 16:
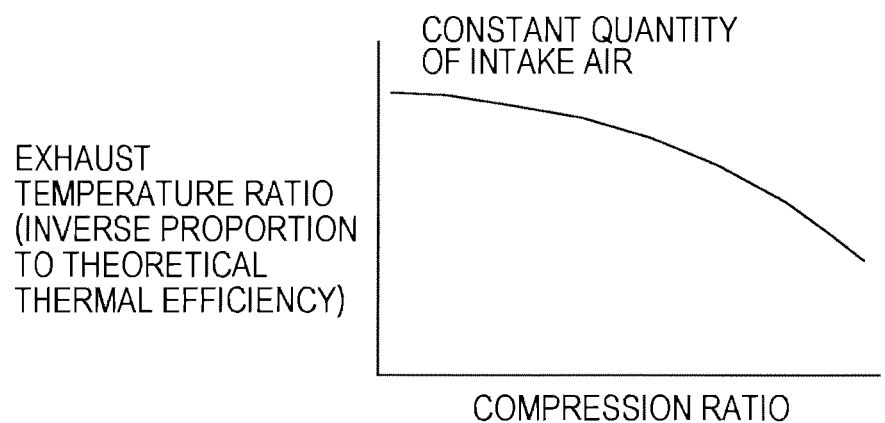
FIG. 16 is a diagram illustrating the correction characteristics of the engine load used for the estimation of the catalyst temperature in the embodiment of the present invention.

The exhaust temperature ratio is a ratio of the exhaust temperature at the time of the basic compression ratio and the exhaust temperature at the time of the compression ratio different from the basic compression ratio when the air charging efficiency is constant, and as illustrated in FIG. 16, as the compression ratio rises, the exhaust temperature ratio is set to a smaller value.

This allows the engine load used for estimating the catalyst temperature to be corrected to a lower temperature as the compression ratio rises even at the same air charging efficiency, so that the catalyst temperature is estimated to be lower as the compression ratio rises, in response to a situation in which the theoretical thermal efficiency rises with an increase in the compression ratio, and the exhaust temperature falls.

Figure 17:
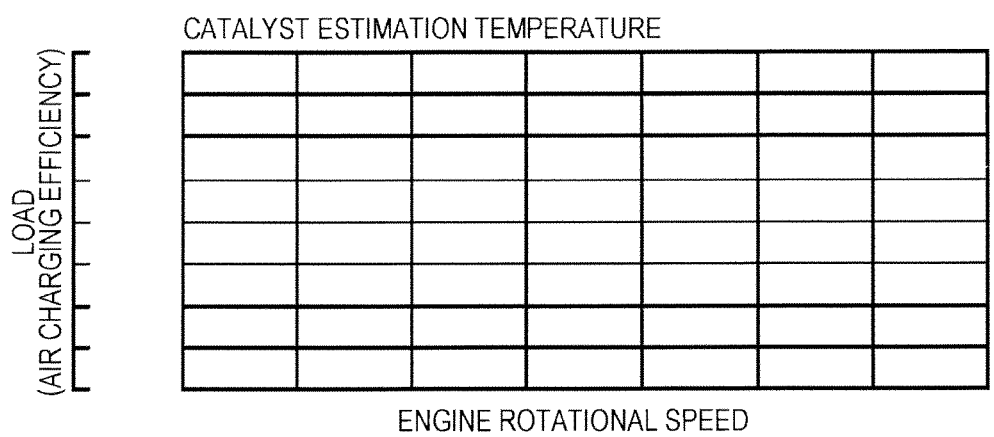
FIG. 17 is a diagram illustrating a map of the catalyst temperature in the embodiment of the present invention.

As a correction according to the compression ratio in the estimation process of the catalyst temperature, as described above, it is possible to correct the engine load used for estimating the catalyst temperature, and it is possible to correct the catalyst temperature, which is retrieved from the catalyst temperature map (FIG. 17) based on the air charging efficiency and the rotational speed of the engine assumed to be a basic compression ratio, depending on the compression ratio.

The process of correcting the catalyst temperature retrieved from the catalyst temperature map depending on the compression ratio is performed, for example, according to Formula (6).

$$\text{catalyst temperature} = \text{map catalyst temperature} \times \text{exhaust temperature ratio} \quad \text{Formula (6)}$$

Figure 18:
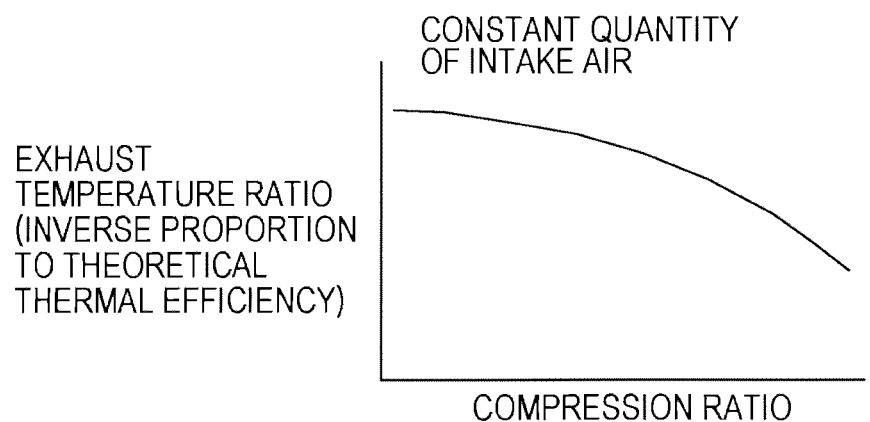
FIG. 18 is a diagram illustrating the correction characteristics of the engine load used for the estimation of the catalyst temperature in the embodiment of the present invention.

The exhaust temperature ratio is a ratio of the exhaust temperature at the time of basic compression ratio and the exhaust temperature at the time of the compression ratio different from the basic compression ratio, when the air charging efficiency is constant, and as illustrated in FIG. 18, as the compression ratio rises, the exhaust temperature ratio is set to a smaller value.

Thus, if the compression ratio is higher than the basic compression ratio, the catalyst temperature (exhaust temperature) estimated on the assumption of a basic compression ratio is corrected to a lower temperature, and if the compression ratio is lower than the basic compression ratio, the catalyst temperature is corrected to a higher temperature.

As described above, by carrying out the correction according to the difference in theoretical thermal efficiency due to the compression ratio in the estimation of the catalyst temperature based on the air charging efficiency, control device 31 can accurately estimate the catalyst temperature even if the compression ratio is changed. Furthermore, based on the estimated value of the catalyst temperature, control device 31 can accurately perform the control of internal combustion engine 1, for example, the correction of ignition timing according to the catalyst temperature, the purge control, and the switching of the combustion mode, and can achieve an improvement in exhaust properties, an improvement in engine output or the like.

Torque Control

Furthermore, control device 31 has, as a control of the engine load, a torque control function that sets the torque command value from the accelerator opening or the like, and controls the adjusting mechanism of the quantity of intake air of internal combustion engine 1 on the basis of the torque command value.

In addition, an example of the adjusting mechanism of the quantity of intake air of internal combustion engine 1 is an electronic control throttle 41. Furthermore, it is possible to use variable valve mechanisms such as variable valve lift mechanism 21, and variable valve timing mechanism 22, as the adjusting mechanism of the quantity of intake air of internal combustion engine 1.

In the torque control, first, the torque command value is calculated from the accelerator opening, the vehicle speed, or the like. The torque command value is converted into the target air charging efficiency. Then, a target value of the air quantity adjusting mechanism is calculated from the target air charging efficiency, thereby controlling the air quantity adjusting mechanism depending on the target value.

In the case of internal combustion engine 1 equipped with variable compression ratio mechanism 23, when the compression ratio is changed, the torque of internal combustion engine 1 varies by a change in theoretical thermal efficiency even at the same air charging efficiency. Thus, if the quantity of intake air does not change with respect to a change in the compression ratio, then the actual torque might deviate from the target torque.

Therefore, control device 31 obtains the target air charging efficiency corresponding to the torque command value, assuming that the compression ratio is the basic compression ratio, and then, control device 31 corrects the target air charging efficiency depending on the compression ratio, and calculates a target value of the air quantity adjusting mechanism from the corrected target air charging efficiency subjected to correction based on the compression ratio.

The correction of the target air charging efficiency according to the compression ratio is performed, for example, according to Formula (7).

target air charging efficiency=target air charging efficiency×compression ratio correction term    Formula (7)

Figure 19A:
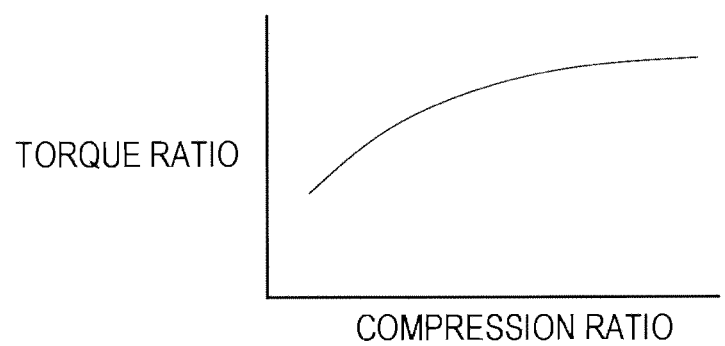
FIGS. 19A and 19B are diagrams illustrating the correction characteristics of a target quantity of intake air in the torque control in the embodiment of the present invention.

As illustrated in FIG. 19A, when the air charging efficiency is constant, since the torque increases as the actual compression ratio becomes higher with respect to the basic compression ratio, the quantity of intake air required for generating the same torque decreases as the compression ratio rises.

Figure 19B:
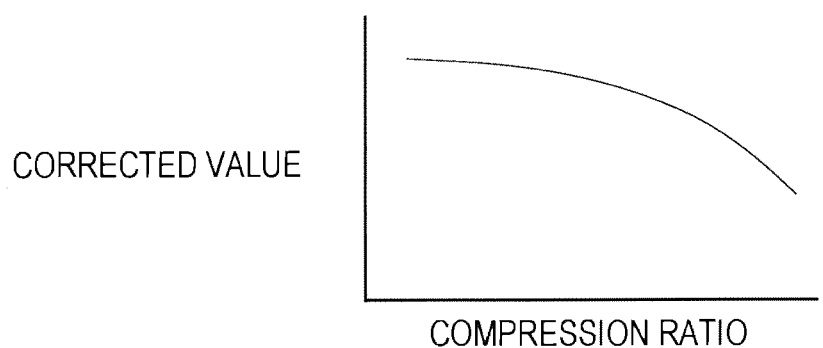

Therefore, as illustrated in FIG. 19B, the compression ratio correction term is set as a smaller value as the compression ratio rises, and when the compression ratio is higher than the basic compression ratio, the target air charging efficiency is corrected to be decreased, and when the compression ratio is lower than the basic compression ratio, the target air charging efficiency is corrected to be increased.

As described above, the control of torque control is corrected depending on the compression ratio, and accordingly, even when the compression ratio is changed by variable compression ratio mechanism 23, it is possible to suppress the actual torque from deviating from the torque command value, and it is possible to accurately control the actual torque to the torque command value.

As the correction according to the compression ratio in the torque control, instead of correcting the target air charging efficiency, it may be possible to correct the torque command value and the target value of the air quantity adjusting mechanism, and consequently, if the quantity of intake air is corrected to be smaller as the compression ratio rises, the correction target is not limited to the target air charging efficiency.

For example, the basic torque command value at the reference compression ratio is calculated from the accelerator opening or the like, and when the actual compression ratio is higher than the reference compression ratio, the basic torque command value is changed to be decreased, and when the actual compression ratio is lower than the reference compression ratio, the basic torque command value is changed to be increased, and the target air charging efficiency is calculated on the basis of the changed torque command value. Thus, when the actual compression ratio is higher than the reference compression ratio, it is possible to reduce the target quantity of intake air compared to the case of a reference compression ratio to generate the same basic torque command value, and when the actual compression ratio is lower than the reference compression ratio, it is possible to increase the target quantity of intake air compared to the case of the reference compression ratio to generate the same basic torque command value.

Also, when setting the operation quantity of the air quantity adjusting mechanism from the target air charging efficiency, without changing the torque command value and the target air charging efficiency based on the torque command value according to the compression ratio, it is possible to correct the operation quantity of the air quantity adjusting mechanism, depending on whether the actual compression ratio is higher or lower than the reference compression ratio.

Also, the control according to the engine load is not intended to be limited to the misfire diagnosis, the ignition timing control, and the estimation of the catalyst temperature listed as an example, and includes a control based on the measured value of the known engine load, a diagnosis control, or the like.

REFERENCE SYMBOL LIST

1 Engine
4 Piston
7 Intake valve
8 Exhaust valve
15 Spark plug
21 Variable valve lift mechanism
22 Variable valve timing mechanism
23 Variable compression ratio mechanism
31 Control device

The invention claimed is:

1. A control device for an internal combustion engine equipped with a variable compression ratio mechanism that can vary a compression ratio, comprising:
   a calculating unit configured to calculate a parameter indicative of output fluctuation in the internal combustion engine;
   a detecting unit configured to detect an air charging efficiency of the internal combustion engine;
   a setting unit configured to set a determination value based on the air charging efficiency detected by the detecting unit;
   a correcting unit configured to correct the determination value set by the setting unit to a greater value as the compression ratio, which is variable by the variable compression ratio mechanism, increases; and
   a determination unit configured to compare the determination value that is corrected by the correcting unit depending on the compression ratio with the parameter calculated by the calculating unit so as to determine an occurrence of misfire in the internal combustion engine.

2. A control method for an internal combustion engine equipped with a variable compression ratio mechanism that can vary a compression ratio, comprising the steps of:
   calculating a parameter indicative of output fluctuation in the internal combustion engine;
   detecting an air charging efficiency of the internal combustion engine;
   setting a determination value based on the detected value of the air charging efficiency;
   correcting the determination value to a greater value as the compression ratio, which is variable by the variable compression ratio mechanism, increases; and
   comparing the determination value that is corrected depending on the compression ratio with the parameter so as to determine an occurrence of misfire in the internal combustion engine.

\* \* \* \* \*